(12) United States Patent
Snowball

(10) Patent No.: US 6,781,137 B2
(45) Date of Patent: *Aug. 24, 2004

(54) FLUID TREATMENT APPARATUS

(76) Inventor: Malcolm Robert Snowball, "Woodside", 4 The Gables, The Plain, Epping, Essex (GB), CM16 6TW (*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 115 days.

(21) Appl. No.: 09/268,131

(22) Filed: Mar. 15, 1999

(65) Prior Publication Data

US 2002/0162968 A1 Nov. 7, 2002

(51) Int. Cl.$^7$ .................... G01N 21/01; G01N 21/51; G01N 23/10
(52) U.S. Cl. .................... 250/432 R; 250/455.11; 250/436; 250/437; 422/241
(58) Field of Search .................... 250/455.11, 432 R, 250/431, 436, 437; 422/24, 108

(56) References Cited

U.S. PATENT DOCUMENTS

| | | | |
|---|---|---|---|
| 4,020,352 A | * 4/1977 | Mahler et al. | 250/436 |
| 4,968,891 A | * 11/1990 | Jhawar et al. | 250/436 |
| 5,069,885 A | 12/1991 | Ritchie | |
| 5,200,156 A | * 4/1993 | Wedekamp | 422/186.3 |
| 5,675,153 A | 10/1997 | Snowball | |

FOREIGN PATENT DOCUMENTS

| | | |
|---|---|---|
| EP | 86303759.4 | 11/1986 |
| GB | 2267635 | 12/1983 |
| WO | WO 9509815 | 4/1995 |

* cited by examiner

Primary Examiner—Jack Berman
Assistant Examiner—Kalimah Fernandez
(74) Attorney, Agent, or Firm—Edwin D. Schindler

(57) ABSTRACT

A fluid treatment apparatus comprises a duct portion (10) having an elongated tubular duct (12), inlet and outlet ports at or adjacent opposite ends of the duct (12), a separate vane portion (11), mounted internally of the duct (12) and carrying a helical guide vane (17), which extends longitudinally of the duct (12) between said inlet and outlet ports (13,14) to promote a helical fluid flow therebetween, and an elongated ultra-violet light source (22) extending longitudinally of the duct (12). The helical guide vane (17) is formed on the separate vane portion (11) f the apparatus and thus the apparatus is simple to construct, since the helical guide vane (17) is formed prior to insertion into duct (12).

8 Claims, 2 Drawing Sheets

FLUID TREATMENT APPARATUS

BACKGROUND OF THE INVENTION

This invention relates generally to fluid treatment and, more particularly, but not solely, to a system for sterilising water or sewage.

Untreated sewage is often pumped into the sea and rivers. This sewage may contain harmful micro-organisms and bacteria such as hepatitis, which can pass into the food chain and which can also be passed on to people who come into contact with the polluted water.

It is well known that high-intensity ultra-violet (UV) light has germicidal properties which can be used to sterilise water. Water treatment companies are reluctant to utilise UV sterilisers because they do not effectively treat all of the water. This occurs because conventional ultra-violet (UV) light fluid treatment apparatus only operate effectively if the fluid being treated is optically clear. For example, if the fluid being treated is cloudy or of high turbidity, the UV light is substantially attenuated away from the close proximity of the light source, thus clumps of microbes which do not come within close proximity of the UV light source do not receive a dose of UV radiation which is sufficient to kill them. Furthermore, microbes tend to collect in clumps, thus microbes at the centre of the clumps are shaded from the UV light by the microbes on the outside of the clump.

U.S. Pat. No. 5,675,153 discloses a fluid treatment apparatus comprising an elongate tubular duct having inlet and outlet ports at or adjacent its opposite ends, an elongate light source extending along a longitudinal axis of the duct and a guide vane extending helically along the internal wall of the duct between said inlet and outlet ports. Radially-extending slots are formed in the guide vane for communicating between adjacent turns of the fluid flow passage defined by the vane.

In use, fluid to be treated flows through the duct from the inlet port to the outlet port along the helical passage defined by the guide vane. This helical flow generates controlled turbulence which ensures that all of the water or other fluid being treated comes within close proximity of the light source during treatment. Fluid flowing along the passage is able to pass through the slots between adjacent turns of the helical passage. As clumps of microbes pass through the slots, they are broken up into individual microbes which can be treated more effectively.

The guide vane is formed by welding a series of small rectangular pieces of metal along a helical line, which is scribed on the wall of the tubular duct. The small rectangular pieces of metal are precisely twisted at their opposite ends prior to attachment to the tubular duct and the grain of the pieces of metal used to form the segments encourages the pieces to adopt the correct shape.

A disadvantage of the above-mentioned fluid treatment apparatus is that it is complicated and time consuming to construct, particularly since the segments are difficult to insert at the centre of the elongate tubular duct.

We have now devised a fluid treatment apparatus which alleviates the above-mentioned problems.

SUMMARY OF THE INVENTION

In accordance with this invention, there is provided a fluid treatment apparatus comprising:

a duct portion having an elongate tubular duct;
inlet and outlet ports at or adjacent opposite ends of the duct;
a separate vane portion, mounted internally of the duct and carrying a helical guide vane, which extends longitudinally of the duct between said inlet and outlet ports and which promotes a helical fluid flow therebetween; and
an elongate light source extending longitudinally of the duct.

The helical guide vane is formed on the vane portion of the apparatus, which is then inserted into the duct of the duct portion. It will be appreciated that the apparatus is thus much easier to assemble than the apparatus disclosed in U.S. Pat. No. 5,675,153, since the helical guide vane is formed prior to insertion into duct.

Preferably, apertures are formed in the helical guide vane for communicating between adjacent turns thereof.

Preferably, the helical guide vane extends around an elongate support, which extends longitudinally of the duct.

Preferably, at least one end of the elongate support is engaged with an end wall of the duct.

Preferably the or each end wall with which the support is engaged is provided on said vane portion of the apparatus.

Preferably the helical guide vane is formed by attaching individual segments of the vane to the surface of the longitudinally-extending support.

Preferably the individual vane segments are pre-shaped prior to attachment, so that when assembled the segments define a helix.

Preferably, a plurality of circumferentially-spaced elongate light sources extend longitudinally of the duct.

Preferably, the or each light source extends through adjacent turns of the guide vane.

In one embodiment, the radially outer edge of the guide vane abuts the internal surface of the tubular duct, so that fluid can only flow on a helical path between the inlet and outlet ducts.

In an alternative embodiment, the radially outer edge of the guide vane is spaced from the internal surface of the tubular duct, so that fluid can flow on an axial as well as helical path between the inlet and outlet ducts. The fluid flows of the two paths interfere to produce a swirling flow of fluid which moves helically along the duct. This swirling action further increases the turbulence inside the duct, moving the water in a controlled double helix action.

Preferably, the vane portion carries a plurality of parallel-extending helical guide vanes.

These and other objects, features and advantages of the present invention will be clearly understood through consideration of the following detailed description.

BRIEF DESCRIPTION OF THE DRAWINGS

An embodiment of this invention will now be described way of example only and with reference to the accompanying drawings, in which.

DETAILED DESCRIPTION OF THE PREFERRED EMBODIMENTS

Figure 1:
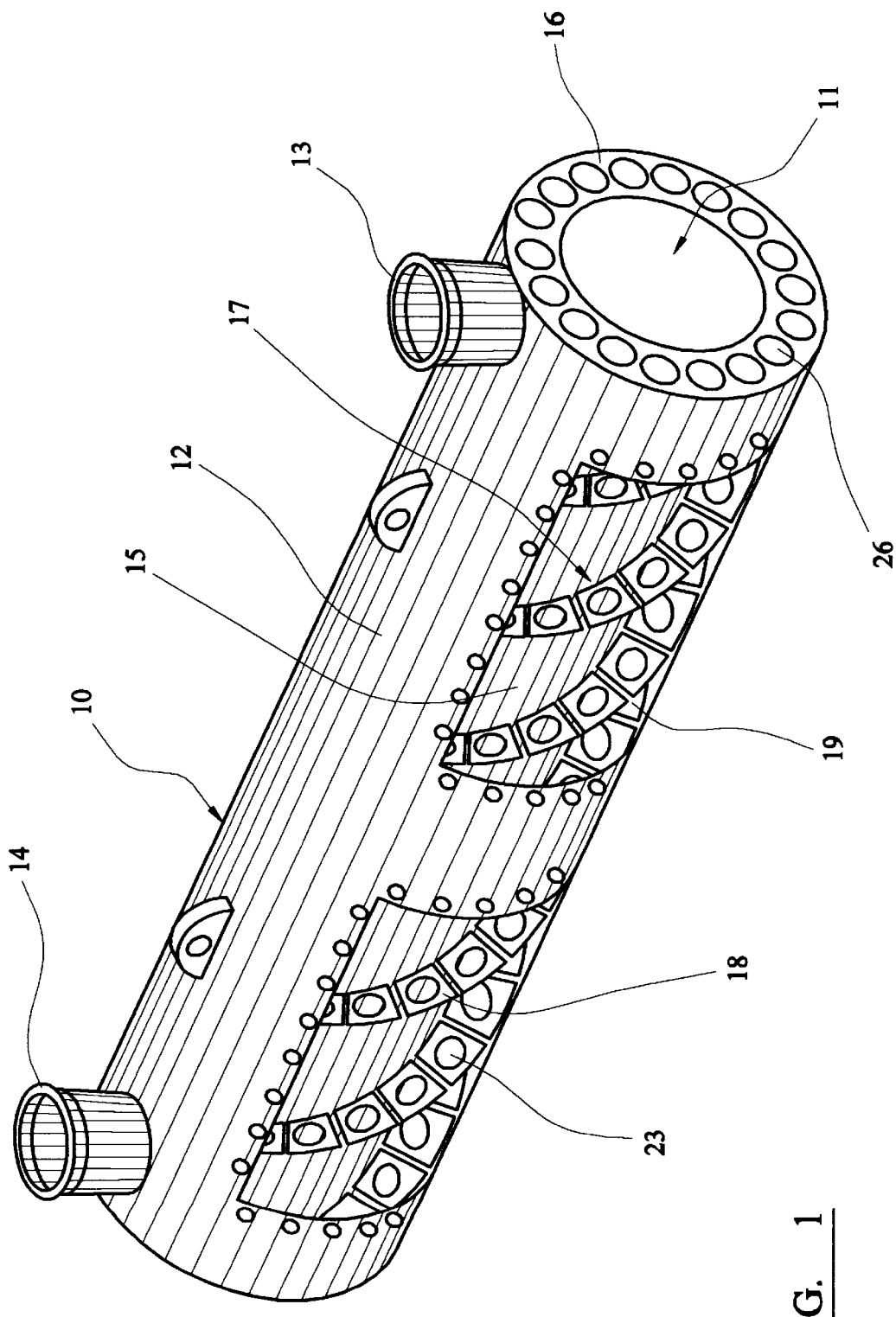
FIG. 1 is a perspective view of an embodiment of water treatment apparatus in accordance with this invention, with some parts being cut away and with some parts being omitted for clarity; and, FIG. 2 is a simplified transverse sectional through the water treatment apparatus of FIG. 1.
Figure 2:
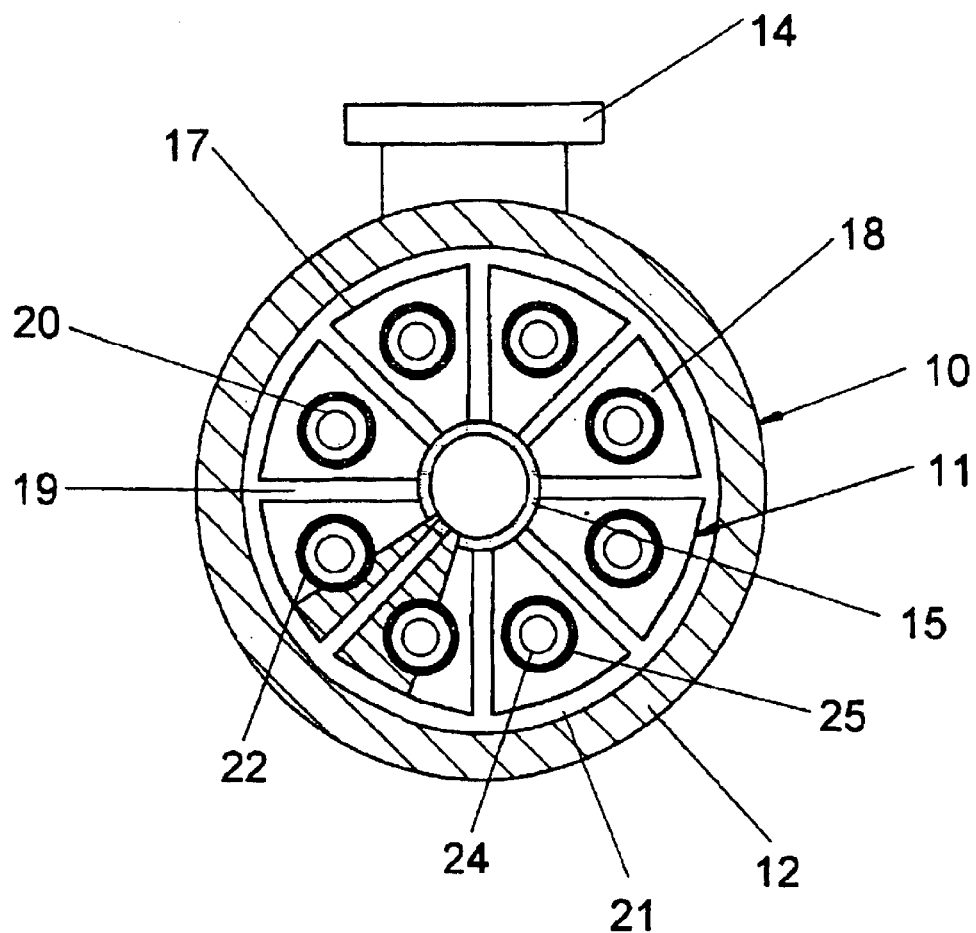

Referring to the drawings, there is shown a water treatment apparatus comprising an external duct portion 10 and a vane portion 11 mounted internally thereof.

The duct portion 10 comprises an elongate tubular duct 12 formed of stainless steel, and inlet and outlet ducts 13, 14 mounted opposite ends of the tubular duct 12.

The vane portion 11 comprises an elongate tube 15 having annular end plates 16 at its opposite. Each annular end plate 16 has a diameter, which is slightly less than the internal diameter of the duct 12. The vane portion 11 further comprises a guide vane 17 which extends helically around the external surface of the tube 15, between opposite ends thereof. The guide vane 17 is divided into segments 18 by radially-extending slots 19, which are formed at regular intervals along its length. Each slot 19, which is preferably 5 mm wide, lies on a line, which extends axially of the tube 15, through the slot 18 of each adjacent turn of the vane 17.

The guide vane 17 is formed by scribing a helical line on the external surface of the tube 15. Small rectangular pieces of stainless steel, cut to the same length as the channels, are then precisely twisted at their opposite ends to form the segments 18 of the vane 17. The grain of the pieces of stainless steel used to form the segments 18 encourages the pieces to adopt the correct shape. The shaped segments 18 are then welded in place along the helical line, formed on the external surface of the tube 15.

A plurality of elongate lamp assemblies 22 are arranged circumferentially around the tube 15 and extend axially thereof between the end plates 16. The lamp assemblies 22 extend through apertures 23 in respective segments 18 of each adjacent turn of the vane 17. Each lamp assembly 22 comprises an ultra-violet lamp 24 mounted inside a quartz glass sleeve 25. The sleeves 25 are sealed at their opposite ends to apertures 26 in respective end plates 16 of the vane portion 11, so that in use the water being treated is isolated from the surface of the lamp 24.

The vane portion 11, including the lamp assemblies 22 is assembled separately from the duct portion 10. The vane portion 11 is then inserted into one end of the duct 12 of the duct portion 10 and pushed axially along the duct 12 until the end plates 16 thereon are respectively located at opposite ends of the duct 12. The tube 15 thus extends concentrically with the duct 12.

The radially outer edge of the guide vane 17 is spaced from the internal surface of the duct 12 to define an annular passage 21 between the inlet and outlets ducts 13,14.

In use, water flows along the duct 11 from the inlet duct 13 to the outlet duct 14. The guide vane 17 acts primarily to channel the water helically. However, a column of water also tends to flow axially along the duct in the annular passage 21 formed between the outer inner edge of the guide vane 17 and the internal surface of the duct 12. These two flows of water interact to product a swirling flow which moves helically along the duct. This double helix flow of water ensures that all of the water flowing through the duct 30 comes within close proximity of the lamp assemblies 22 at some time during its passage through the apparatus. Thus, all of the bacteria or microbes in the water receive lethal doses of UV radiation from the ultra-violet lamp 24.

Further, the slots 19 in the guide vane 33 allow a small amount of water to flow between adjacent turns of the helical flow passage. The elongate lamp assemblies 22 act as vane to promote the flow of water through the slots 34. This causes any clumps of microbes and bacteria in the swirling flow to be broken up as they are forced through the slots 19. Dispersal in this manner prevents microbes being shielded from the UV light by other microbes. Slots 19 are used in the vane 17 instead of apertures, so that there is no shading from UV light inside the duct 12.

The quartz glass sleeve 25 is preferably coated with a layer of PTFE, which isolates the water being treated from the surface of the glass sleeve 25. The turbulent flow of water creates a scrubbing action which removes any matter which may be built up on the coated surface of the sleeve and which would attenuate the UV light. Furthermore, the PTFE layer prevents iron or manganese in the water from reacting with the quartz glass sleeve 25. Such a reaction would reduce the transparency of the quartz glass sleeve.

The emitted light kills micro-organisms in the water so that it can be safely pumped into the sea or rivers, or other body of water.

While the preferred embodiment of the invention has been shown and described, it will be apparent to those skilled in the art that changes and modifications may be made therein without departing from the spirit of the invention, the scope of which is defined by the appended claims.

I claim:

1. A fluid treatment apparatus, comprising:

a duct portion including an elongate tubular duct having a central longitudinal axis;

an inlet port and an outlet port with both said inlet port and said outlet port being at, or adjacent to, opposite ends of said duct portion;

a separate vane portion mounted internally of said duct portion, said separate vane portion having a helical guide vane extending longitudinally of said duct portion between said inlet port and said outlet port and defining a flow path extending longitudinally and helically around said central longitudinal axis of said elongate tubular duct between said inlet port and outlet port; and, a plurality of elongate light sources mounted parallel to one another at respective spatially separated points arranged radially outwardly of said central longitudinal axis of said elongate tubular duct and extending longitudinally of said elongate tubular duct between said inlet port and said outlet port through adjacent turns of said flow path extending longitudinally and helically around said central longitudinal axis of said elongate tubular duct.

2. The fluid treatment apparatus according to claim 1, wherein said helical guide vane has apertures for communicating between adjacent turns thereof.

3. The fluid treatment apparatus according to claim 1, wherein said helical guide vane extends around an elongate support extending longitudinally of said duct portion.

4. The fluid treatment apparatus according to claim 3, wherein said elongate support has at least one end engaged with an end wall of said duct portion.

5. The fluid treatment apparatus according to claim 4, wherein said end wall with which said elongate support is engaged is on said separate vane portion.

6. The fluid treatment apparatus according to claim 3, wherein said helical guide vane is formed by attaching individual segments of said separate vane portion to a surface of said elongate support.

7. The fluid treatment apparatus according to claim 1, wherein said helical guide vane has a radially outer edge abutting an internal surface of said elongate tubular duct.

8. The fluid treatment apparatus as according to claim 1, wherein said helical guide vane has a radially outer edge spaced apart from an internal surface of said elongate tubular duct.

* * * * *